United States Patent [19]

Drews

[11] Patent Number: 5,027,736
[45] Date of Patent: Jul. 2, 1991

[54] ELASTICALLY DEFORMABLE BUMPER SYSTEM

[75] Inventor: Terence E. Drews, Grand Rapids, Minn.

[73] Assignee: Impact Protection Systems, Minn.

[21] Appl. No.: 537,795

[22] Filed: Jun. 14, 1990

[51] Int. Cl.$^5$ ............................................. B63B 59/02
[52] U.S. Cl. ................................. 114/219; 405/215; 14/75
[58] Field of Search ................ 114/219, 263; 405/212, 405/215; 267/139, 140; 293/102, 143; 14/75

[56] References Cited

U.S. PATENT DOCUMENTS

| | | | |
|---|---|---|---|
| 3,169,756 | 2/1965 | Miller | 114/219 X |
| 3,411,304 | 11/1968 | Miller | 114/219 X |
| 3,498,252 | 3/1970 | Peacock | 114/219 |
| 4,050,689 | 9/1977 | Barton et al. | 267/140 X |
| 4,920,907 | 5/1990 | Richter | 114/219 |

*Primary Examiner*—Ed Swinehart
*Attorney, Agent, or Firm*—Evenson, Wands, Edwards, Lenahan & McKeown

[57] ABSTRACT

An elastically deformable bumper for cushioning impact forces at a relatively rigid member includes a forward bumper wall member having an impact receiving surface at a first side thereof. At least one support web extending from a second side of the forward bumper wall member and providing the primary resistance to deformation of the forward bumper wall member by the impact forces is provided. The support web terminates in a support web abutment surface having a free end adapted for engagement with a rigid member. A bumper anchor aperture accommodates an anchoring device to hold the bumper in position at the rigid member. The bumper anchor aperture extends from the first side of the forward bumper wall member through the support web and support web abutment surface.

13 Claims, 3 Drawing Sheets

ELASTICALLY DEFORMABLE BUMPER SYSTEM

BACKGROUND AND SUMMARY OF THE INVENTION

The present invention relates to elastically deformable bumper systems of the type that are used on boat docks, buildings, transport trailers, and the like. Especially preferred embodiments of the present invention are improved bumper systems for boat docks that serve to cushion the impact of boats against the docks.

Historically there have been many boat dock designs, which utilize some type of elastically deformable bumper cushioning the impact of the boats against the boat dock rigid frame members. Many boat docks are provided with portions of rubber tires nailed to the surfaces that are engagable by the boats when docking at the dock. These rubber tires serve to cushion the impact of the boat against the dock during docking procedures and during the rocking of the boat in the water, while anchored to the dock and also during docking procedures. There are various problems with the use of such tires. First, to many people, the part tires nailed to the docks are ugly and detract from the appearance of the docks. Second, the tires are usually made of some type of petroleum-base rubber or the like, and tend to mar boats rubbing thereagainst, leaving black marks on the boats. Also, the corrosion and wear at the nailing positions of the tire sections to the dock could cause deterioration of the connection and unsightly discolorization of the tires and dock.

In view of the problems with the part tires as bumpers, there have been many proposals for using other types of elastically deformable fenders that are attached to the dock and/or to the boat.

U.S. Pat. No. 4,628,850 to Day et.al. discloses a marine fender arrangement which is adapted to be hung over the side of the boat and/or dock to protect against impacts. This fender has an outer flexible shell and a solid foam bun, and is constructed as a fender which is tied to the boat or dock by means of ropes or the like. Such marine fender arrangements are usually stowed on a boat and are brought out and placed in position only when the boat is docked. This type of marine fender arrangement is inconvenient to use in those situations where frequent boat docking and undocking occurs, due to the necessity to untie and adjust the fenders in position. Furthermore, when leaving the boat dock at a dock for a long period of time, such rope tied fenders become dislodged or are too small to accommodate all of the relative movement positions of the boat, especially in rough weather and/or occasions where significant tidal changes in water depth occur.

There have also been many fixed installations of elastically deformable marine fenders at boat docks, as exemplified by U.S. Pat. No. 3,949,697 to Yueada; U.S. Pat. No. 4,267,792 to Kimura et.al.; U.S. Pat. No. 4,733,992 to Dehlen, and U.S. Pat. No. 4,756,266 to Sakuraoka. These constructions all have various cross-sectional configurations for effecting predetermined desired non-linear deformation patterns. Due to these rather complicated forms, such bumper constructions are rather expensive to construct. Furthermore, in most of these constructions the mechanism for attachment of the fender or bumper at a boat dock or boat is made by bolting flat web portions directly to a boat dock surface at locations spaced from the intentional deformation area of the bumpers.

U.S. Pat. No. 2,890,880 to Hompe et.al.; U.S. Pat. No. 2,926,904 to Erlbacher; and U.S. Pat. No. 3,539,173, are exemplary of multi-part fender or bumper arrangements which are attachable to a boat dock or the like by threaded bolts engaging clampingly with the bumper unit. These bolts are disposed such that they are recessed and are located spaced from the impact receiving surface of the elastic bumper member so as to allow for elastic deformation. These multi-part type arrangements require complicated manufacturing and installation steps. They also place the attachment bolts at relatively thin plate-like portions of the elastic material bumper structure, thereby increasing the risk that large lateral and side collision rubbing forces against the impact surface disrupt the connection of the bumper, since these portions can be torn away.

An object of the present invention is to provide a bumper system which is economical to produce and install, which is reliable and durable in service, which has and maintains a pleasing external appearance, and which performs its bumper functions, without causing discoloration of the bumper or the respective parts being cushioned by the bumper.

According to one aspect of the invention, these objects are achieved by providing an elastically deformable bumper for cushioning impact forces at a relatively rigid member, comprising:

a forward bumper wall member having an impact receiving surface at a first side thereof, a support web extending from a second side of the forward bumper wall member, said support web terminating in a support web abutment surface adapted for engagement with a rigid member, and a bumper anchor aperture for accommodating an anchoring device to hold the bumper in position at the rigid member, said bumper anchor aperture extending from the first side of the forward bumper wall member through the support web to the support web abutment surface.

By providing the bumper anchor aperture in the support web which extends from the impact receiving surface back to the abutment surface for engaging the rigid member, such as the boat dock side board or the like, it is reliably assured that the bumper member will not be dislodged by forces acting thereon. In effect, the anchor is at a thick effective structural part of the bumper member, namely at the reinforcing webs. In especially preferred embodiments, the clamping surface of the anchors are disposed at least one-fourth of the distance between the impact receiving surface and the rigid member that it is attached to. In especially preferred embodiments, the anchoring aperture is provided as a countersunk aperture with the clamping surface more than half of the distance of the impact receiving surface to the rigid member that it is attached to, such that the entire bolt or screw head can be completely concealed in this countersunk outer section.

In especially preferred embodiments in the boat dock bumper environment, reflector units are installed in the recessed anchor apertures on top of the anchoring bolt and are still recessed sufficiently from the impact receiving surface so as not to interrupt the elastic deformation impact absorption movement of the bumper system during use. In this manner, the safety of the boat dock is substantially enhanced since these reflectors at the boat dock bumpers serve to forewarn the boat drivers of the position of the bumpers and dock during night boating operations.

In especially preferred embodiments, the elastically deformable bumper member is constructed as a unitary deformable plastic member which has the impact receiving surface at one side of a front wall which is then merged into side walls which extend parallel to the reinforcing webs and thus serve to completely enclose the outer configuration of the bumper when in an installed position. The corners and edges of the bumper member are rounded slightly so as to give a smooth overall appearance to the bumper and so as to accommodate absorption of impacts from all directions.

In especially preferred embodiments, the elastically deformable plastic bumper member is made of "Dupont Alcryn" plastic material, which is especially processed to produce predetermined elastic deformation characteristics. This material is also resistant to sun and other weather aging environmental conditions so that the bumper can be used as a boat dock bumper for many years without deterioration of the appearance or the operation thereof.

Since the bumper can be assembled by a simple screw or bolt attachment at a boat dock or the like, the same can be easily installed even by amateurs.

According to another aspect of certain preferred embodiments of the invention, special corner bumper members are provided which readily adapt themselves to attachment at dock or other structure corners that may not be precisely right angle corner connections or predetermined angle corner connections. To accomplish this corner attachment, the present invention provides a longitudinally extending U-shaped exterior cross-section, with the legs of the U adapted to abut against the boat dock member frame or the like and with the bridge of the U serving as the primary impact receiving surface. In order to accommodate the attachment thereof at irregular angular corner sections, the side walls of the U-shaped bumper member are cut away on the internal side at an angle which exceeds the predetermined desired corner design angle at the rigid frame members to which it is to be attached by between 2 and 10 degrees, preferably between 3 and 5 degrees. For example, for a right angle corner at a boat dock, the angle would be between 92° and 95°. With this arrangement, the bumper member can be attached very firmly along both side walls of the corner section of the dock, with an adjustment range of several angular degrees.

In especially preferred embodiments, the corner members are also provided with extra reinforcement webs from the front impact wall to the cut out section of the edge to thereby further reinforce the corner section, as these reinforcing corner webs will be close to or abutting with the dock frame members at the corner. For especially preferred embodiments of the corner members, the anchoring apertures closest to the corner are spaced from one another by a greater distance than they are along the length. Due to the extra reinforcement at the corner due to the bending connection and the reinforcing corner webs, the corner structure is still sufficiently rigid and durable to withstand the expected heavy bumper functions at this corner.

In especially preferred embodiments, the anchoring apertures through the support webs are disposed laterally offset from one side of the bumper, which side is then provided with additional double reinforcing webs along a short portion thereof, whereby the effective reinforcement across the width of the impact receiving wall is substantially constant, even at the location of the anchoring apertures and anchors. In this manner, a uniform bumper resistance is provided over the full width of the bumper.

Although the preferred embodiments described herein relate to boat dock bumpers, preferred embodiments are also contemplated where the bumper members are mounted at airline terminal baggage carts or other transport vehicles which experience frequent low velocity collisions. At airline terminals, such bumpers can accommodate low speed impact of the baggage carts against airplane parts, without damaging the airplane.

Other objects, advantages and novel features of the present invention will become apparent from the following detailed description of the invention when considered in conjunction with the accompanying drawings.

DETAILED DESCRIPTION OF THE DRAWINGS

Figure 1:
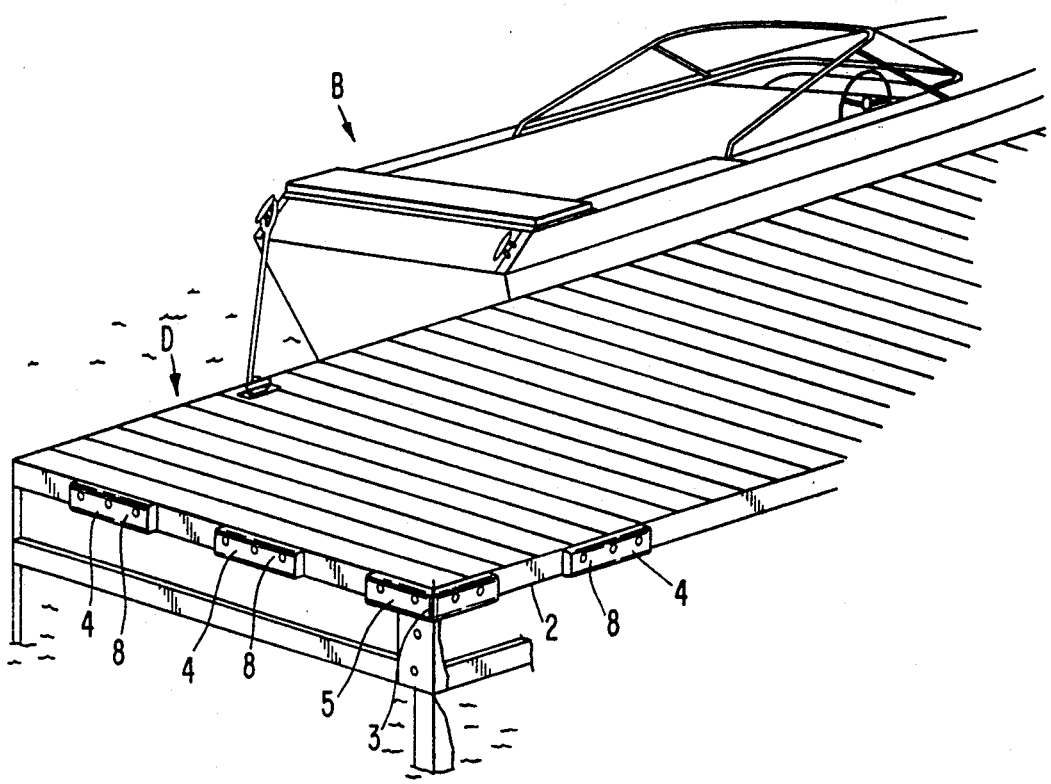
FIG. 1 is a perspective view which schematically depicts a boat at a boat dock fitted with bumper members constructed according to preferred embodiments of the present invention.

Referring to FIG. 1, a boat B is shown docked at a dock D. The dock D has side board members or frame members 2 which intersect at a corner 3 of the dock D. The bumper system of the present invention as applied in the FIG. 1 embodiment includes linear bumper members 4 and corner bumper members 5. These linear bumper members are attached at spaced apart locations along the length of the dock frame members 2. The corner bumper member 5 is disposed at the outside of the intersection of the two dock frame members 2.

Figure 2:
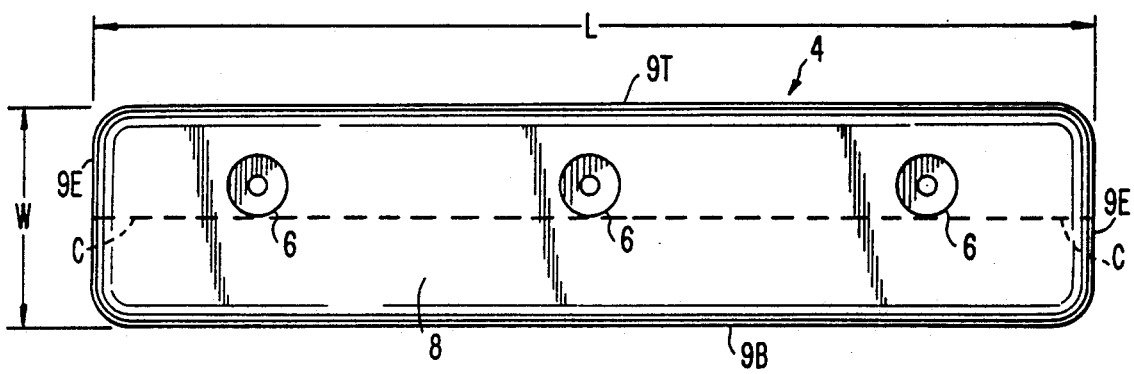
FIG. 2 is a plan view from the outside of a longitudinal bumper member of FIG. 1.
Figure 3:
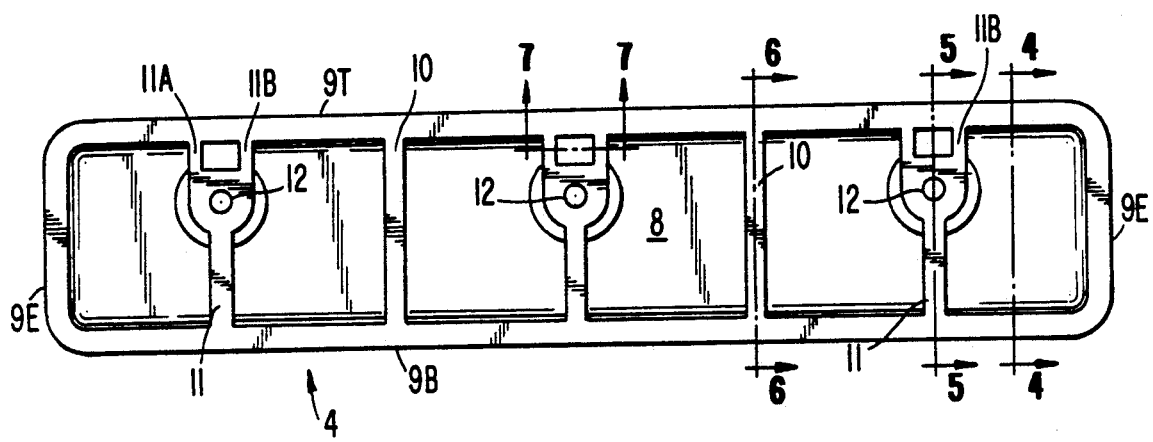
FIG. 3 is a bottom view of the bumper member of FIG. 2.

FIG. 2 is a view of one of the individual linear bumper members 4, taken from the outside as viewed with respect to its in-use position at the dock. Member 4 is a unitary member of plastic material which is elastically deformable. The member 4 includes anchoring apertures 6 that are spaced along its length, with one in the middle and one at each side thereof. These apertures 6 are slightly offset in the upward vertical direction from the longitudinal center line C of member 4. Each bumper member 4 includes an impact surface wall 8 which in the installed position is parallel to the dock frame member 2 that it is attached to. This impact receiving surface wall 8 is adjoined at its edges on all four sides by walls 9T, 9B, 9E which extend down to an abutment for abutting against the dock frame member 2. The top side wall member is designated 9T, the bottom side wall member is designated 9B, and the end side wall members are designated 9E in the drawings. In certain preferred embodiments, the width W of member 4 is between 1¾" and 3" and the length L of member 4 is between 8" and 18".

Figure 4:
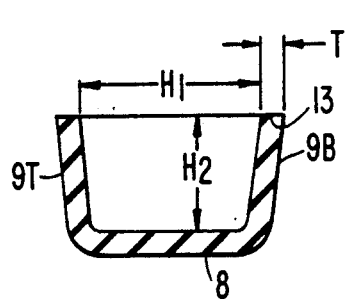
FIG. 4 is a cross-sectional view of the bumper of FIGS. 2 and 3, taken along the section line 4—4 of FIG. 3.
Figure 5:
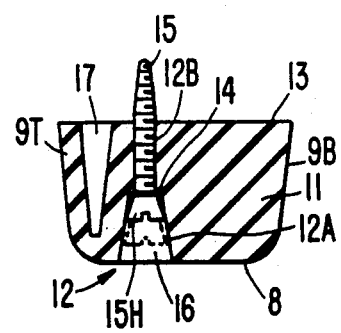
FIG. 5 is a cross-sectional view of the bumper of FIGS. 2 and 3, taken along the section line 5—5 of FIG. 3.
Figure 6:
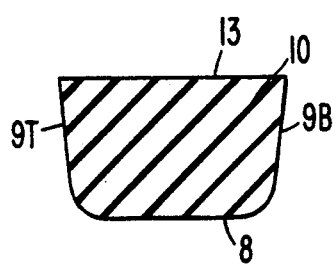
FIG. 6 is a cross-sectional view of the bumper of FIGS. 2 and 3, taken along the section line 6—6 of FIG. 3.
Figure 7:
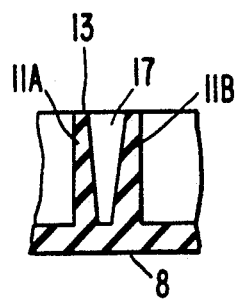
FIG. 7 is a cross-sectional view of the bumper of FIGS. 2 and 3, taken along the section line 7—7 of FIG. 3.

The wall sections 9, 9B and 9T all have substantially similar thickness T which is preferably about one-tenth of the distance between the wall members 9B and 9T (distance H1) which is substantially the same as the distance H2 from wall 8 to the abutment surfaces in plane 13 shown in FIG. 4. Since, as FIG. 4 shows, this leaves a substantially hollow profile, some reinforcement is needed to maintain a relatively firm shape of the bumper member when in use. According to the preferred embodiment of the invention, this reinforcement is provided by the end walls 9E and the reinforcing webs 10 and 11. The reinforcing webs 10 are simple unobstructed wall members of the thickness T which fill in the space between the walls 9B, 9T and 8.

Disposed intermediate the end walls 9E and the reinforcing webs 10, are the further reinforcing webs 11. These reinforcing webs 11 are configured so as to form anchoring attachment apertures 12 which extend from the abutment surface of the outer wall 8 to the plane surface 13 which abuts against the dock frame member 2 when attached thereto. This plane 13 is the end position of the web sections 11, which web sections are thickened and separated into web section parts 11A and 11B at the side thereof of the aperture closest to the wall 9T. The web 11 is provided with a countersunk aperture 12 which includes a first outer section 12A which is tapered to a clamping shoulder 14. A cylindrical section 12B leads from this shoulder 14 to the abutment surface 13. With this construction, clamping bolt 15 with bolt head 15H can rest against the shoulder 14 and be either bolted into or screwed into the attachment frame member 2. The distance between the abutment surface of wall 8 and the shoulder 14 is sufficient to accommodate the bolt head 15H, as well as a reflector 16 which will still be disposed below the surface of wall 8 by a distance sufficient to accommodate in-use elastic deformation of the member 4 without causing abutment of the boat or other member from the outside against the reflector 16. The reflector can be attached by threading, a press fit, adhesive, or other attaching means.

The tapering of the opening 17 between the web parts 11A, 11B and the top wall 9T is matched in a predetermined manner to the tapering and dimensions of the tapering opening 12A, along with the thickness of the wall sections 11A and 11B so as to provide a uniform balanced elastic deformation of the bumper member across the surface 9 of wall member 8.

Figure 8:
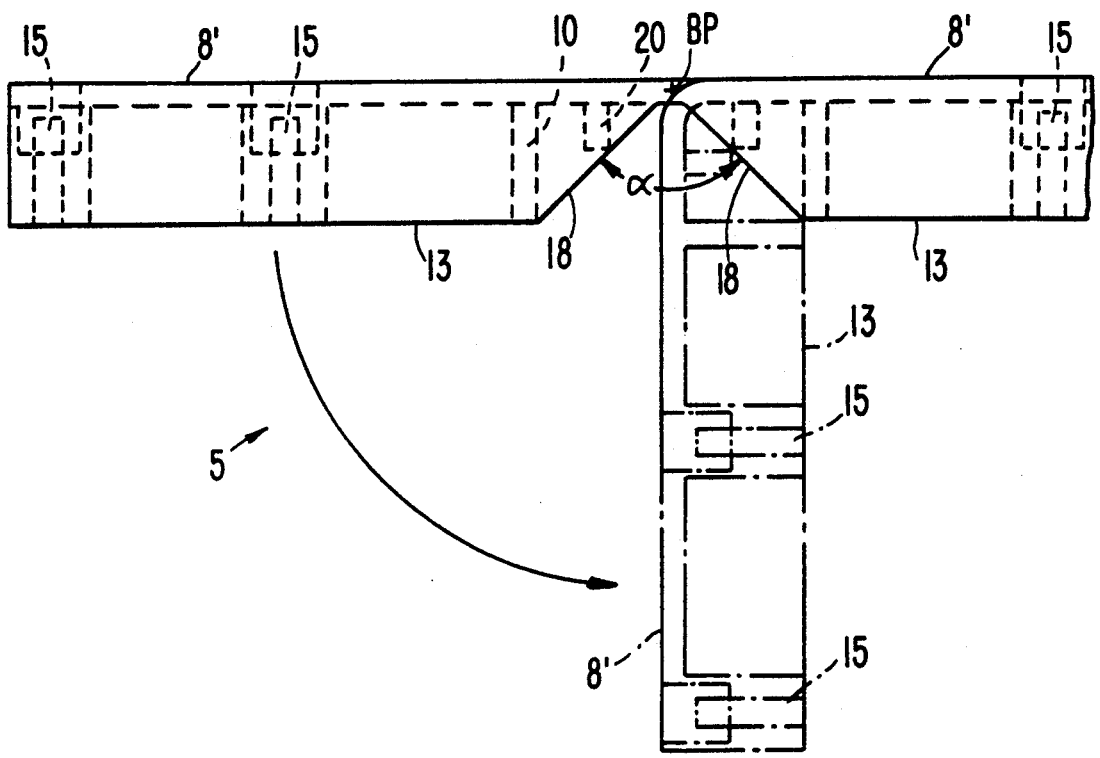
FIG. 8 is a schematic sectional view of a corner bumper member of FIG. 1.

FIG. 8 shows a construction of the corner bumper member 5 from FIG. 1. This member 5 is a unitary member which has a basic cross-section which is identical to that of the U-shaped cross section of member 4. It also includes a plurality of reinforcing web structures 11 corresponding to the webs 11 of the member 4. Additionally, uninterrupted reinforcing webs 10 are provided which are disposed most closely adjacent the corner section where the member 5 is adapted to bend around bending point B since at that point only the thickness T of the wall member 8 is present, the portions having been cut away along the lines 18 from a point immediately adjacent the end of members 10 at the abutment surface 13 to the inside of the wall 9. The two cut-away sections 18 of the two parts of the member 5 essentially intersect with one another at point BP.

Figure 9:
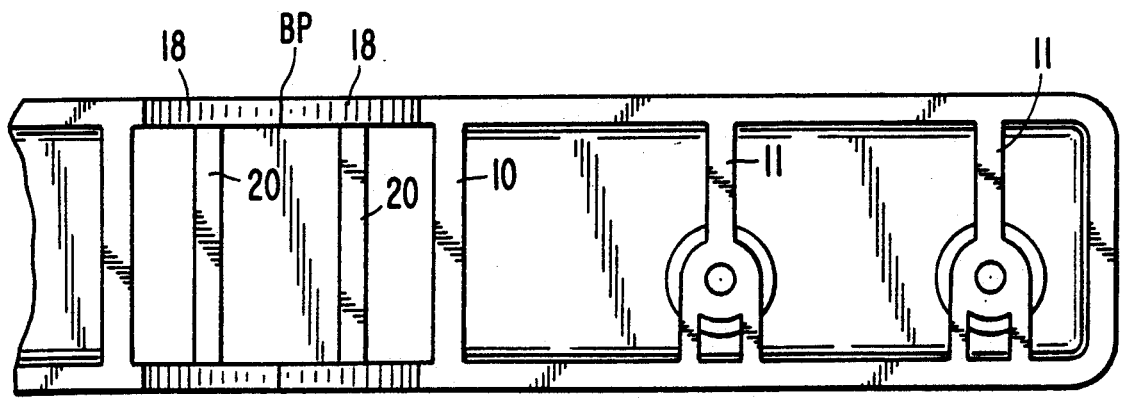
FIG. 9 is a partial bottom view of the corner member of FIG. 8.

In the unbended flat condition of the member 5, the angle α between the sections 18 of the two parts is between 92° and 95°. With this construction, assuming a design right angle corner to be attached to, the bumper member can adapt itself to manufacturing tolerance deviations of the boat dock. In practice, such deviations of 0° to 5° on a right angle corner can reasonably be expected due to the wood construction and large dimensions of these boat docks. Thus, with the arrangement of the present invention, even the amateur can in a very simple manner adapt the corner bumper sections to the corners of the boat dock without substantial effort or difficulty. Additional short reinforcing web members 20, as shown in FIG. 9, are provided which extend up to a mid-section of the side walls of the cut away corner parts. These short web members 20 serve as additional reinforcement at the corner section which is expected to be subject to impacts in all directions during use.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An elastically deformable bumper for cushioning impact forces at a relatively rigid member, comprising:
   a forward bumper wall member having an impact receiving surface at a first side thereof,
   at least one support web extending from a second side of the forward bumper wall member and providing a primary resistance to deformation of said forward bumper wall member by the impact forces, said support web terminating in a support web abutment surface having a free end adapted for engagement with a rigid member,
   and a bumper anchor aperture for accommodating an anchoring device to hold the bumper in position at the rigid member, said bumper anchor aperture extending from the first side of the forward bumper wall member through the support web and support web abutment surface.

2. A bumper according to claim 1, further comprising a plurality of said support webs with a corresponding plurality of bumper anchor apertures extending therethrough.

3. A bumper according to claim 1, wherein said forward bumper wall member and support web are integrally formed as a one-piece elastically deformable plastic part.

4. A bumper according to claim 1, wherein said rigid member is a boat dock frame member, and wherein said bumper is a boat dock bumper, said impact receiving surface being disposed to cushion the impact of boats being docked at the boat dock.

5. A bumper according to claim 1, wherein the anchor aperture includes a first section starting at the impact receiving surface and a second section terminating at the free end of the support web abutment surface, said first section and second section having different cross-sectional areas and forming a transition section therebetween which accommodates clamping engagement of the anchoring device.

6. A bumper according to claim 5, further comprising an anchoring device which is disposed completely within the anchor aperture when in an in-use clamping position.

7. A bumper according to claim 6, further comprising a reflector which is disposed on top of the anchoring device completely within the anchor aperture when in an in-use position.

8. A bumper according to claim 3, wherein said plastic part is constructed as a foldable part configured for attachment to a corner structure.

9. A method of making an elastically deformable bumper for cushioning impact forces at a relative rigid member, said method comprising:
   a forward bumper wall member having an impact receiving surface at a first side thereof,
   providing at least one support web extending from a second side of the forward bumper wall member, said support web terminating in a support web abutment surface having a free end adapted for engagement with a rigid member,
   and providing a bumper anchor aperture for accommodating an anchoring device to hold the bumper in position at the rigid member, said bumper anchor aperture extending from the first side of the forward bumper wall member through the support web and support web abutment surface.

10. A method according to claim 8, wherein said forward bumper wall member and support web are integrally formed as a one-piece elastically deformable plastic part.

11. A method of using an elastically deformable bumper for cushioning impact forces at a relatively rigid member, comprising:
    a forward bumper wall member having an impact receiving surface at a first side thereof;
    a support web extending from a second side of the forward bumper wall member, said support web terminating in a support web abutment surface having a free end adapted for engagement with a rigid member,
    and a bumper anchor aperture for accommodating an anchoring device to hold the bumper in position at the rigid member, said bumper anchor aperture extending from the first side of the forward bumper wall member through the support web and support web abutment surface, said method including placing the bumper in position on a rigid member such that said free end of the support web abutment surface engages said rigid member, and bolting the bumper to the rigid member by means of an anchor bolt extending through the anchor aperture, with an outer end of said anchor bolt spaced from the impact receiving surface.

12. A method according to claim 11, further comprising placing a light reflector on top of the anchor bolt so that said light reflector is spaced from the impact receiving surface while being clearly visible from outside the impact receiving surface.

13. A method according to claim 12, wherein said rigid member is a boat dock frame member, and wherein said bumper is a boat dock bumper, said impact receiving surface being disposed to cushion the impact of boats being docked at a boat dock.

* * * * *